United States Patent [19]
Toyokura

[11] Patent Number: 5,915,258
[45] Date of Patent: *Jun. 22, 1999

[54] APPARATUS AND METHOD FOR GENERATING AND OUTPUTTING A LIST OF A PLURALITY OF STORED FORMS

[75] Inventor: Yoichi Toyokura, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/733,338

[22] Filed: Oct. 17, 1996

Related U.S. Application Data

[63] Continuation of application No. 08/074,420, Jun. 10, 1993, abandoned.

[30] Foreign Application Priority Data

Jun. 12, 1992 [JP] Japan ................................ 4-153353

[51] Int. Cl.⁶ ...................................................... G06F 3/14
[52] U.S. Cl. ........................... 707/505; 707/509; 707/517
[58] Field of Search ..................... 395/275, 821, 395/101; 707/505–509, 517

[56] References Cited

U.S. PATENT DOCUMENTS

| | | | |
|---|---|---|---|
| 4,542,378 | 9/1985 | Suganuma et al. ...................... | 340/734 |
| 4,686,525 | 8/1987 | Nagata ..................................... | 348/790 |
| 4,715,006 | 12/1987 | Nagata ..................................... | 364/523 |
| 4,718,784 | 1/1988 | Drisko ....................................... | 400/68 |
| 4,763,281 | 8/1988 | Arakawa .................................. | 364/523 |
| 4,891,769 | 1/1990 | Tasaki ...................................... | 364/519 |
| 4,926,347 | 5/1990 | Uchida et al. ........................... | 364/519 |
| 5,025,398 | 6/1991 | Nelson ..................................... | 364/519 |
| 5,157,767 | 10/1992 | Nihei ........................................ | 707/508 |
| 5,231,579 | 7/1993 | Tsuchiya et al. . | |
| 5,325,303 | 6/1994 | Walz et al. .......................... | 364/464.02 |
| 5,355,476 | 10/1994 | Fugumura ............................... | 395/600 |
| 5,404,294 | 4/1995 | Karnik . | |
| 5,537,525 | 7/1996 | Gotoh et al. . | |
| 5,557,723 | 9/1996 | Holt et al. . | |
| 5,671,339 | 9/1997 | Kumada .................................. | 395/101 |
| 5,682,540 | 10/1997 | Klotz, Jr. et al. . | |

FOREIGN PATENT DOCUMENTS 2182471  5/1987  United Kingdom .

Primary Examiner—Christopher B. Shin
Attorney, Agent, or Firm—Fitzpatrick, Cella, Harper & Scinto

[57] ABSTRACT

An output apparatus includes a memory to store data representing a plurality of forms, an instructor to instruct the generation of a list of stored forms, and an output unit to output the form list with an indication where in the memory each of the forms is stored.

12 Claims, 13 Drawing Sheets

(FORM NO.)   (CONTENTS)

APPARATUS AND METHOD FOR GENERATING AND OUTPUTTING A LIST OF A PLURALITY OF STORED FORMS

This application is a continuation of application Ser. No. 08/074,420, filed Jun. 10, 1993, which is now abandoned.

BACKGROUND OF THE INVENTION

1. Field of the Invention

The present invention relates to output method and apparatus for outputting an image based on inputted data for outputting onto an output medium.

2. Related Background Art

FIG. 2 shows a constructional concept of such a kind of conventional output apparatus, for example, a printer 1 (shown by reference numeral 1). In the diagram, reference numeral 2 denotes an external apparatus such as a host computer or the like which generates print data to the printer 1; 3 denotes an input unit to receive the print data; 4 denotes an input buffer to temporarily store the inputted data; 5 denotes an analyzer to analyze the inputted data; 6 denotes a page buffer to store the result of the analysis; 7 denotes a developer to develop the data into an output image of a bit map memory or the like on the basis of the content in the page buffer 6; and 8 denotes a frame memory to store the developed output image. The frame memory 8 is constructed by an RAM (random access memory). Reference numeral 9 denotes an output unit for controlling an output mechanism 10 in accordance with the content in the frame memory 8. The output mechanism 10 generates image data by, for example, a laser beam or the like. Reference numeral 11 denotes a recording medium such as a recording paper or the like and 12 indicates a form storage in which form data has been stored in an ROM or an RAM.

In the printer 1 with the above construction, print data supplied from the external apparatus 2 is received by the input unit 3 and the image data is once stored in the input buffer 4 in the RAM. The analyzer 5 analyzes the received data and forms the data into a form adapted to give an instruction to the developer 7 into the page buffer 6 as a result of the analysis. In accordance with the content in the page buffer 6, the developer 7 develops a corresponding output image into the frame memory 8 as, for example, a binary image of one page. The output unit 9 generates the binary image which has been developed in the frame memory 8 to the output mechanism 10 as a video signal to, for example, execute an ON/OFF control of the laser beam. In this instance, the binary image is generated to the output mechanism 10 synchronously with a well-known BD (beam detection) signal. On the basis of the input video signal, the output mechanism 10 forms an image onto the recording medium 11 in accordance with a well-known electrophotographic recording method.

In case of registering a form, the external apparatus instructs the registration of the form by, for example, a command or the like and subsequently generates form data.

The form storage 12 has a structure as shown in FIG. 3. That is, the form storage comprises: a form management table which is constructed by form numbers and pointers indicative of storage destination addresses of the corresponding form data; and areas in which the substances of the form data have been stored.

When the registration of the form is confirmed, the analyzer 5 stores the instructed form data in the area in the form storage 12 in which the substance of the form data has been stored. The storage destination address of the substance is stored in the pointer area of the instructed form number in the form management table. As a pointer in the form management table in which the substance of the form data doesn't exist, NULL data is stored. In addition to that the form data is supplied from the outside, the form data can be also prepared in a ROM or the like. The form data is managed as mentioned above.

When the external apparatus requests to overlap and generate the form data (form overlay print instruction), the instructed form number is first checked and the pointer of the corresponding form data is obtained. In accordance with the form data indicated by the pointer, the developer 7 develops a form image into the frame memory 8. An image such as a character or the like corresponding to the print data sent together with the form instruction data is developed in the frame memory 8 by the developer 7. After the form image and the image corresponding to the print data are developed in the frame memory 8, the processes which have already been described above are executed on the data, so that the multiplexed image comprising the form and the character or the like can be printed (form overlay print) onto the recording medium.

In the above conventional example, however, as a method for knowing which form has been registered or stored, there is only a method whereby the print data including the command which actually designates the form overlay is sent. Therefore, it is impossible to explicitly know in which form number the form has actually been registered.

SUMMARY OF THE INVENTION

The present invention is made in consideration of the above conventional techniques and it is an object of the invention to provide output method and apparatus which can confirm the location of the stored form.

To solve the above problems, another object of the invention is to provide output method and apparatus in which a plurality of forms which are multiplexed to data for outputting and are outputted are previously stored and in the case where the generation of a list of forms stored is instructed, the form list can be outputted in a format indicative of at least the location of the effective form.

Further, another object of the invention is to provide output method and apparatus in which the location of the stored form and which form exists can be known.

Further, another object of the invention is to provide an output method and apparatus in which a plurality of forms which are multiplexed to data for outputting and are outputted are previously stored and in the case where the generation of a list of forms stored is instructed, the form list can be outputted in a format indicative at least the location of the effective form and the content of the form.

Further, another object of the invention is to provide an output method and apparatus in which the location of the stored form and which form exists can be known and an output medium can be efficiently used.

Further, another object of the invention is to provide an output method and apparatus in which a plurality of forms which are multiplexed to data for outputting and are outputted are previously stored and in the case where the generation of a list of stored forms is instructed, at least the location of an effective form and a part of the content of the form are set to one set and a plurality of sets are outputted onto one output medium.

Further, another object of the invention is to provide an output method and apparatus which can easily discriminate each form stored.

Further, another object of the invention is to provide an output method and apparatus in which a plurality of forms which are multiplexed to data for outputting and are outputted are previously stored and in the case where the generation of a list of forms stored is instructed, at least the location of an effective form and a portion that is peculiar to the form are set to one set and a plurality of sets are outputted onto one output medium.

Further, another object of the invention is to provide an output method and apparatus in which when the generation of a list of forms is instructed, the form list is outputted in a format indicative of at least the location of an effective form.

BRIEF DESCRIPTION OF THE PREFERRED EMBODIMENTS

Embodiments according to the present invention will be described in detail hereinbelow with reference to the drawings.

Figure 1:
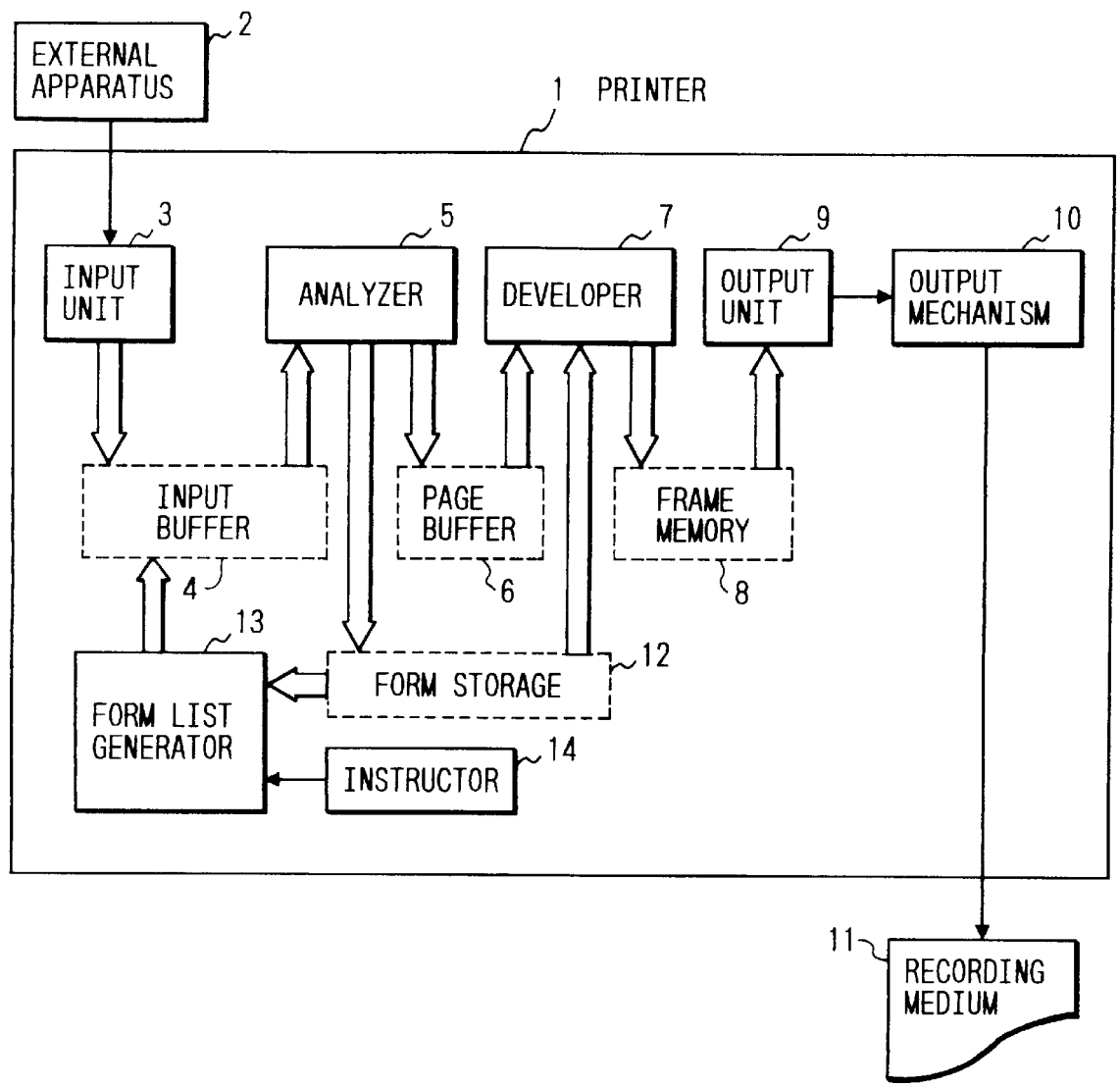
FIG. 1 is a block diagram of a printer which is common to each embodiment.
Figure 2:
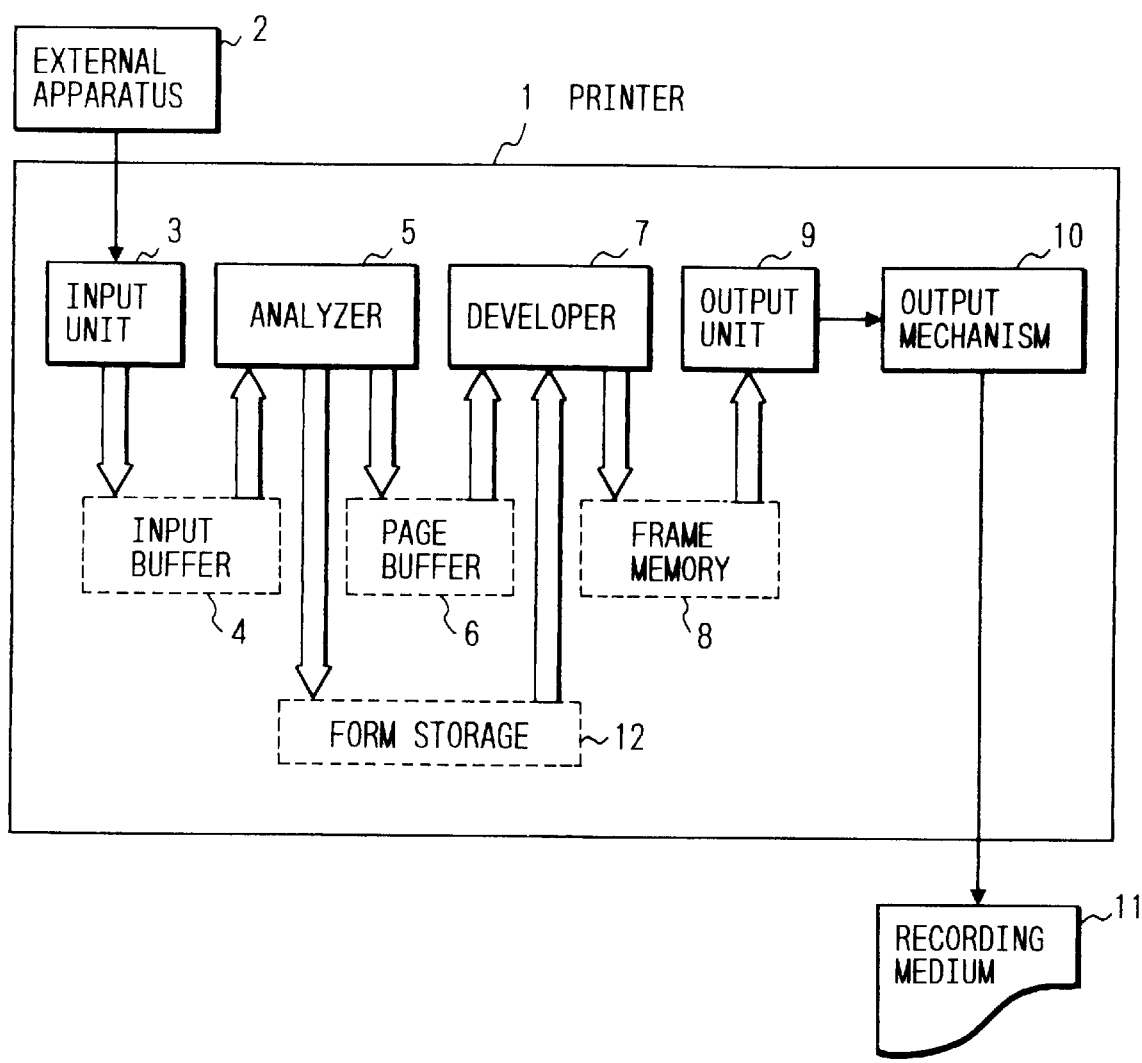
FIG. 2 is a block diagram of a conventional printer.

FIG. 1 shows a construction conceptual diagram of a printer according to an embodiment. The printer shown in FIG. 1 differs from the conventional printer of FIG. 2 which has already been described before because it includes a form list generator 13 and an instructor 14. Since there is no functional difference with respect to the other constructional elements, their descriptions are omitted.

The instructor 14 is a user interface which the user can directly instruct. Although the instructor 14 is provided on an operation panel, it can be also constructed by a dip switch or the like.

Since the ordinary printing operation and form overlay operation are similar to those in the conventional printer, their descriptions are omitted here.

In such a construction, the operator executes a predetermined operation with the instructor 14, in the embodiment, and the contents stored and managed in the form storage 12, namely, a form list is printed. Specifically speaking, the above processes are executed as follows.

First, the user turns on a button (or switch) to generate a form list by using the instructor 14, such as a panel or the like. There is no need to specially provide such a button to give an instruction. It is also possible to display a menu on a display unit provided for the operation panel and the printing mode to print the form list can be also selected from the menu.

When the instruction to print the form list is detected, the contents in the form storage 12 are checked and the output data of the form list is made and stored into the input buffer 4. After that, by executing the ordinary printing process, a form list output can be derived.

Figure 4:
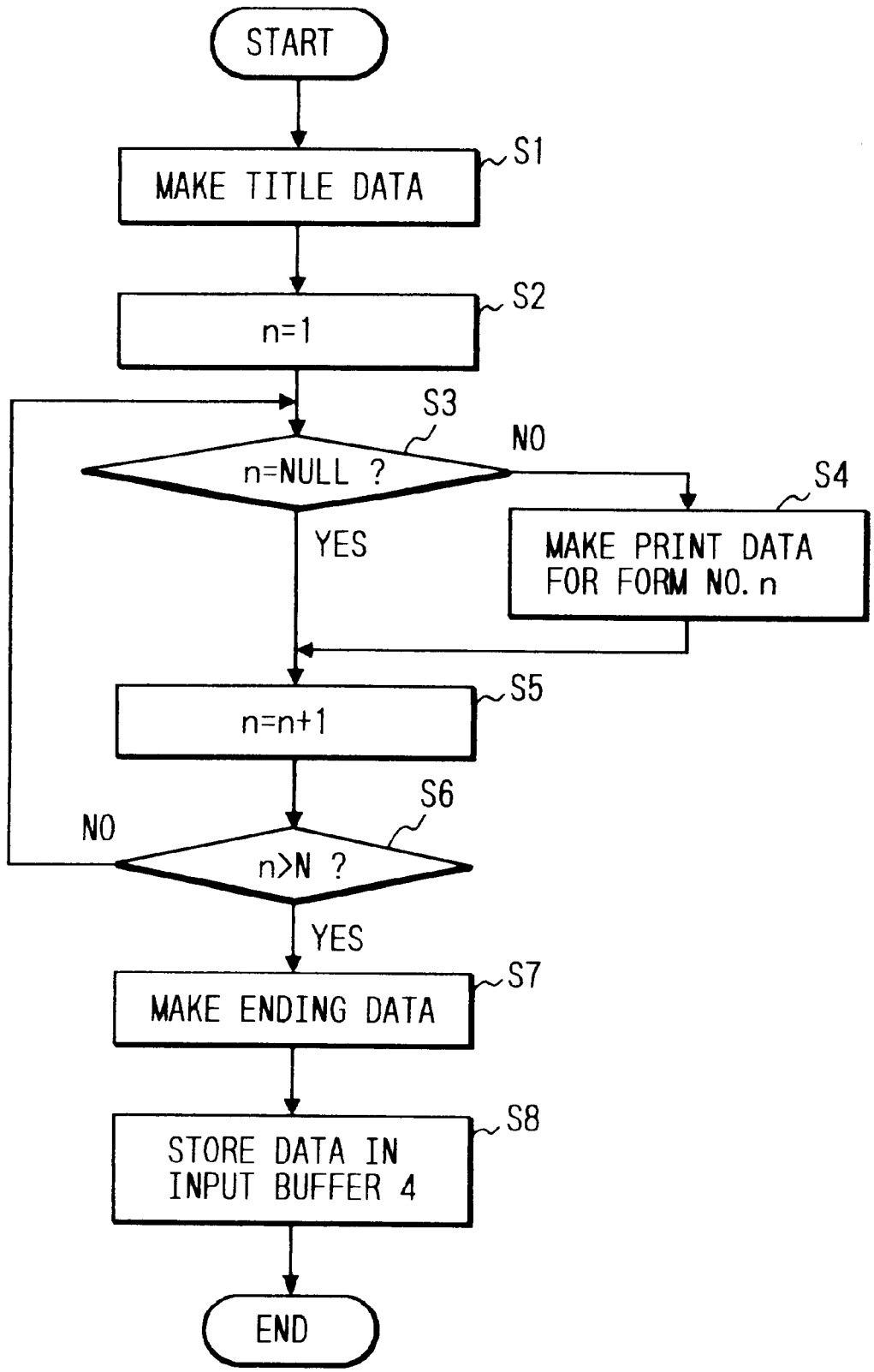
FIG. 4 is a flowchart showing processes of a form list generator in the first embodiment.
Figure 5:
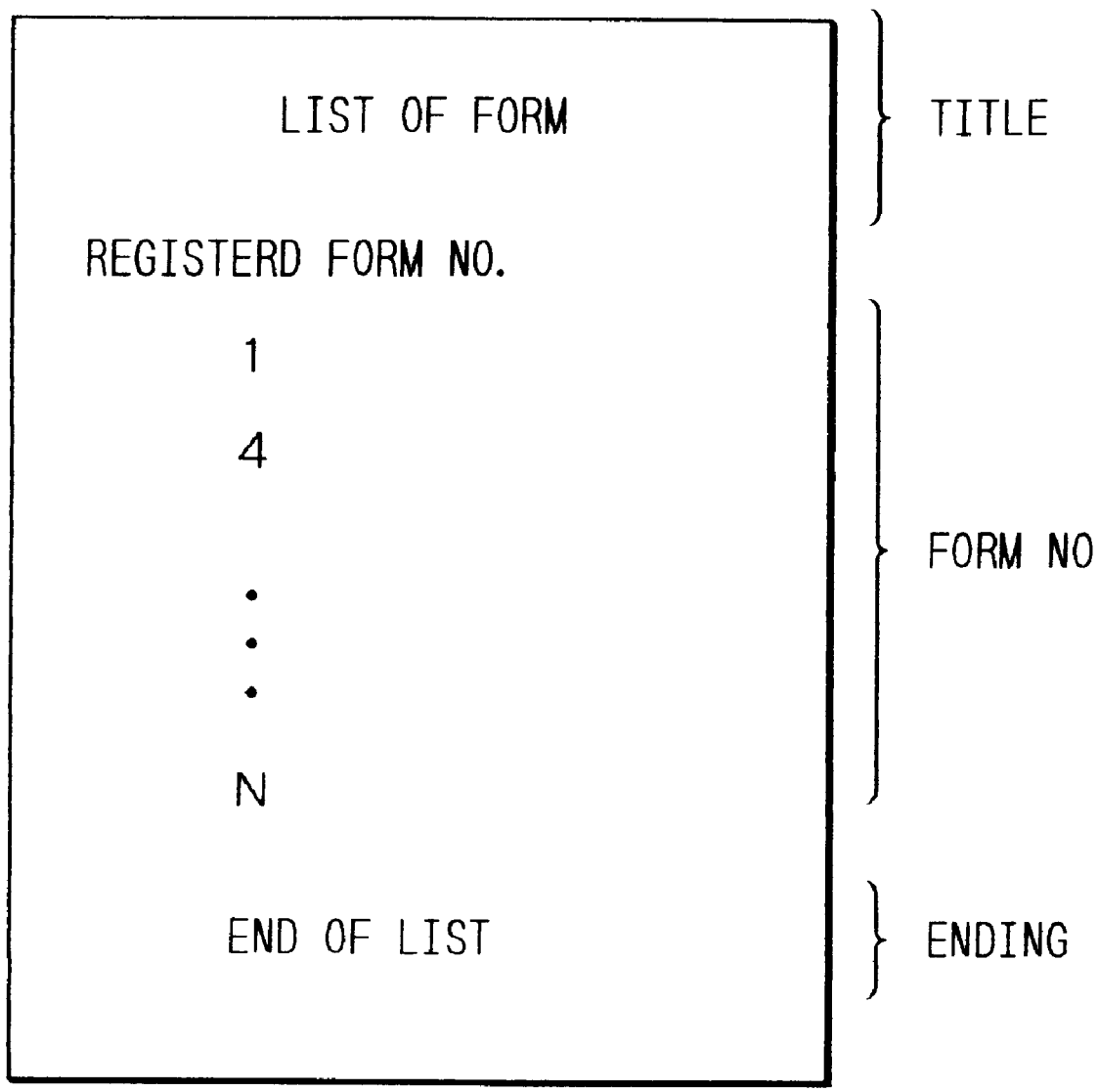
FIG. 5 is a diagram showing an output example of a form list in the first embodiment.

FIG. 4 shows a processing procedure according to the form list printing in the embodiment (in detail, FIG. 4 shows the processing contents in the form list generator 13). FIG. 5 shows an example of the result based on the execution of such processes.

The form list generator 13 first makes the data of a title portion of the form list in step S1. Subsequently, an initial value "1" is inserted into a variable "n" indicative of the form data in step S2.

When proper forms are listed up from among the actually registered forms, in step S3, whether the pointer corresponding to the number n indicates "NULL" or not, namely, whether it has been registered or not is discriminated with reference to the management table in the form storage 12. When the pointer doesn't indicate "NULL", namely, when it has been registered, data to print the number n is made in step S4 and the processing routine advances to step S5. In step S5, the number n is increased by only "1". In step S6, a check is made to see if the new number n is larger than a registration limit number N or not. By repeating the processes in steps S3 to S6 as mentioned above N times, the list-up of the forms is finished.

After completion of the list-up, data of the ending portion is made in step S7. The data formed is stored in the input buffer in step S8 and the processing routine is finished.

The form list shown in FIG. 5 is outputted by the above processing routine.

Figure 6:
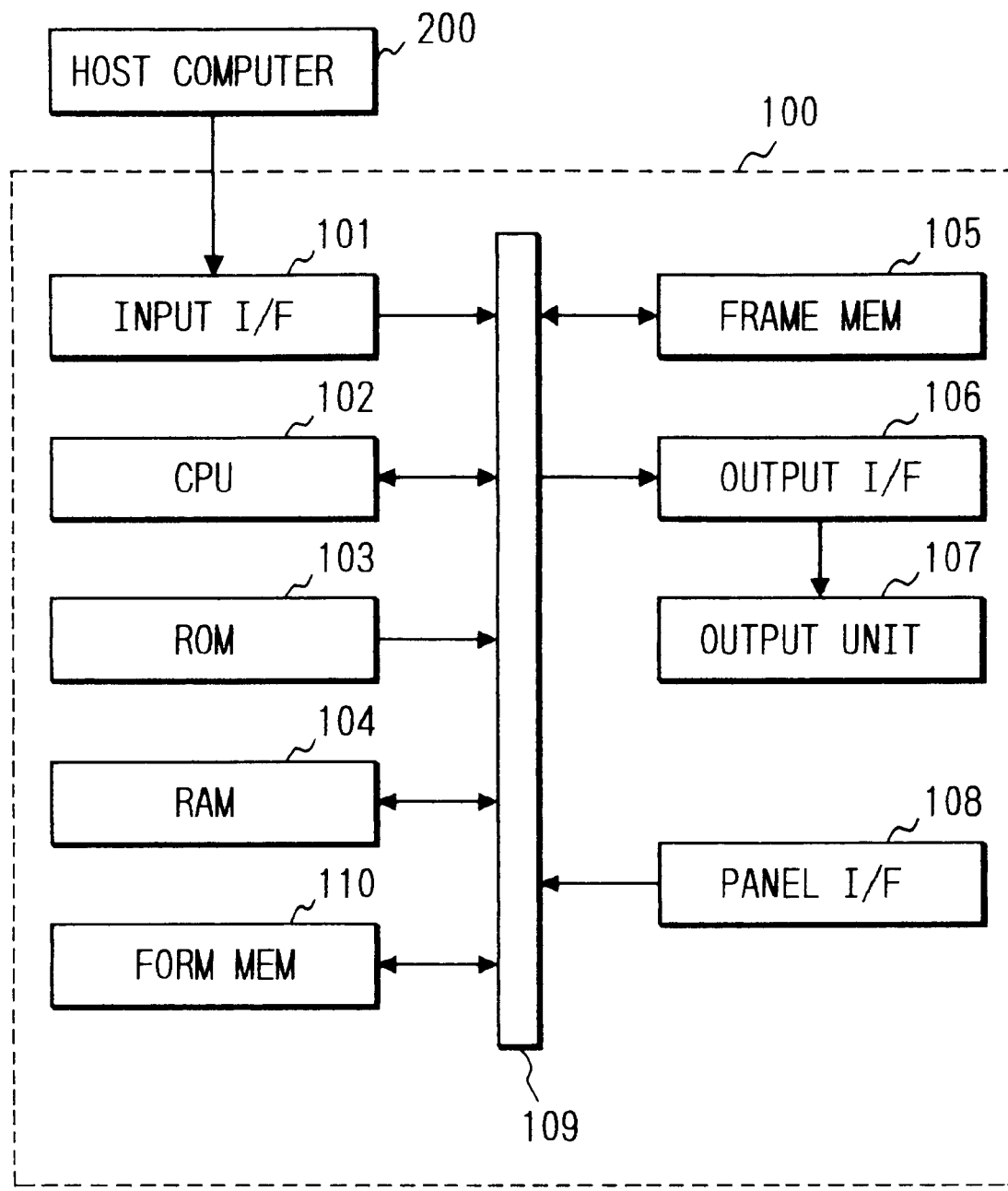
FIG. 6 is a block showing a practical construction which is common to each embodiment.

A practical construction of the printer of the embodiment is shown in FIG. 6.

In the diagram, reference numeral 100 denotes a printer according to an embodiment; 200 denotes a host computer which generates print information; 101 denotes an input interface to input the print information from the host computer 200; 102 denotes a CPU to control the whole printer 100; 103 denotes a ROM in which operation processing procedures (program regarding the flowchart of FIG. 4 and the like) of the CPU 102 have been stored and in which character font patterns and the like have also been stored; and 104 denotes a RAM which is used for storage work and includes, for example, an area for the CPU 102, an input buffer to store the print data received from the host computer 200, a page buffer to construct an output image of one page from the received print information, and the like. Reference numeral 105 denotes a frame memory to develop the output image. The frame memory 105 is also constructed by a RAM. Reference numeral 106 denotes an output interface to output image data to an output unit 107 to actually print the output image; 108 denotes a panel interface which is used for the user to instruct the apparatus; and 110 denotes a form memory (corresponding to the form storage 12) in which the form data has been stored. The form memory 110 is backed up by a power source (not shown) so that the registered contents are not erased even when a power source of the apparatus is turned off. In case of constructing the form memory 110 by an EEPROM, an external memory device (magnetic disk or the like), or the like, the backup power source is not always necessary. The above component elements are connected to a system bus 109.

Figure 13:
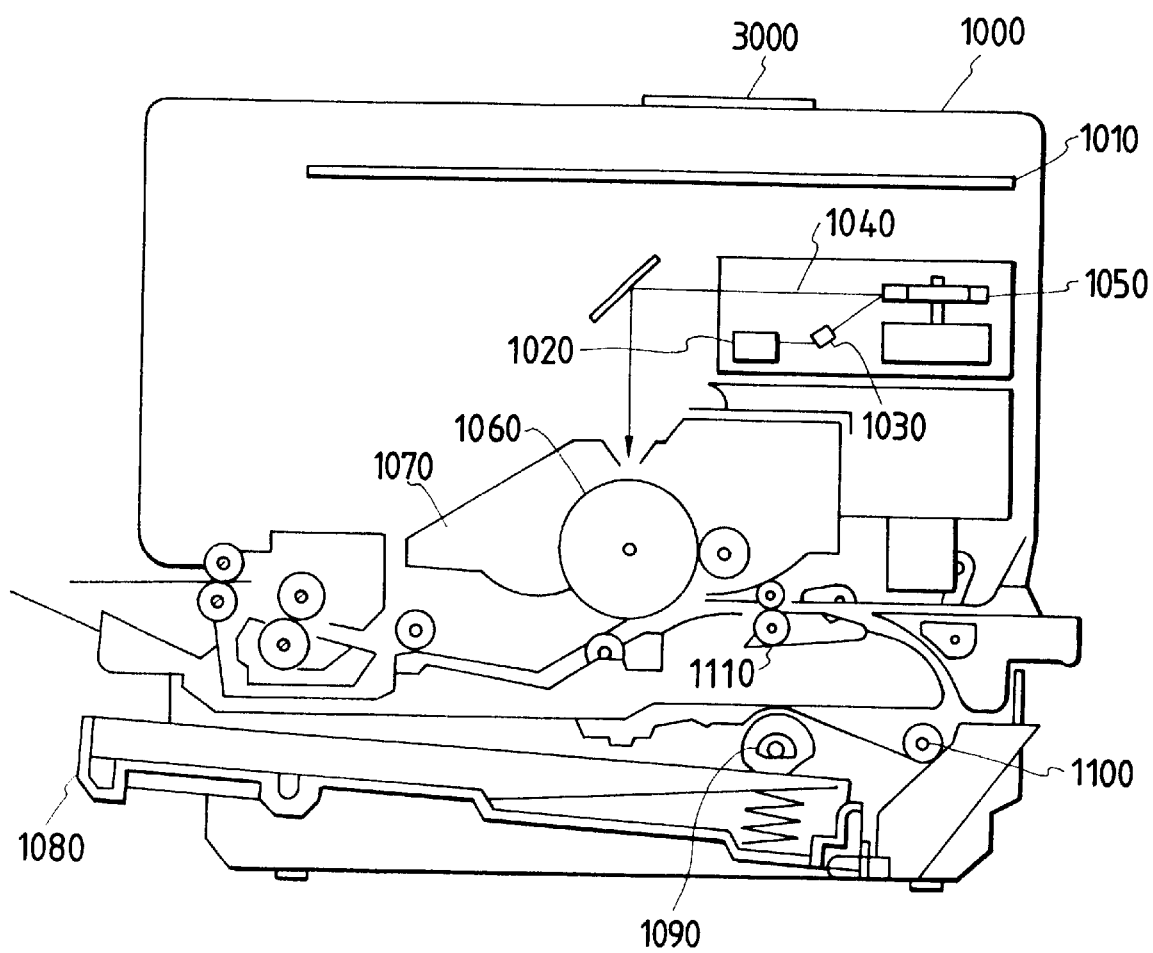
FIG. 13 is a cross sectional diagram showing a construction of a printer which is common to each embodiment.

FIG. 13 shows an example of a structure of the output unit 107.

In the diagram, reference numeral 3000 denotes an operation panel (connected to the system bus 109 through the foregoing panel interface 108) on which switches for operations, an LED display, and the like are arranged. Reference numeral 1010 denotes a printer control unit for controlling the whole printer 100 and for analyzing character information or the like which is supplied from a host computer. The printer control unit 1010 corresponds to the construction excluding the output unit 107 in FIG. 1 and mainly executes processes for converting character information into a video signal of a corresponding character pattern supplied to a laser driver 1020.

The laser driver 1020 is a circuit to drive a semiconductor laser 1030 and drives and controls the semiconductor laser 1030 in accordance with an inputted video signal. A laser beam 1040 which is emitted from the semiconductor laser 1030 is deviated to the right and left by a rotary polygon mirror 1050 and scans an electrostatic drum 1060 and exposes the drum to the laser beam 1040. An electrostatic latent image of a character pattern is, consequently, formed on the drum 1060. The latent image is developed by a developing unit 1070 arranged around the drum 1060 and, after that, the developed image is copy transferred onto a recording paper. Cut sheets are used as recording papers. The cut sheet recording papers are enclosed in a sheet cassette 1080 set in the printer 100 and are picked up and fed one by one into the printer by a feed roller 1090 and conveying rollers 1100 and 1110 and conveyed to the drum 1060.

Although the above embodiment has been described with respect to the example in which the user directly instructs the instructor 14 so as to print the form list, it is also possible to print the form list when predetermined command data is received from the host computer 200. In this case, the panel interface 108 as shown in FIG. 6 is not always necessary. For example, it is also possible to construct the device in a manner such that whether the input data is a form list instruction command or not is discriminated by the analyzer 5 and when it is the form list instruction command data, such an instruction is transferred to the instructor 14 and the form list can be generated by processes similar to those mentioned above.

Although the form list output data which is made by the form list generator has been stored in the input buffer in the above embodiment, such data can be also formed so as to be directly stored in the page buffer. In such a case, since the data can be directly stored in the page buffer, the process to perform the analysis can be omitted.

According to the embodiment as described above, which form number can be used at present can be checked.

It is also possible to print the form list by "number and name" or by "only name" by adding means for also registering the name when the form is registered.

[Description of the Second embodiment]

The second embodiment will now be described. In the above embodiment (first embodiment), the list indicating which number of the form data has been registered has been printed. There is, however, also a case where the user wants to know the contents of each form. In the second embodiment, therefore, the list to identify the registered (stored) form numbers is not merely printed but is printed in a state in which each form corresponding to the form number can be understood.

Since the constructional concept and practical construction of the apparatus are similar to those in the first embodiment described above, their descriptions are omitted here.

Figure 8:
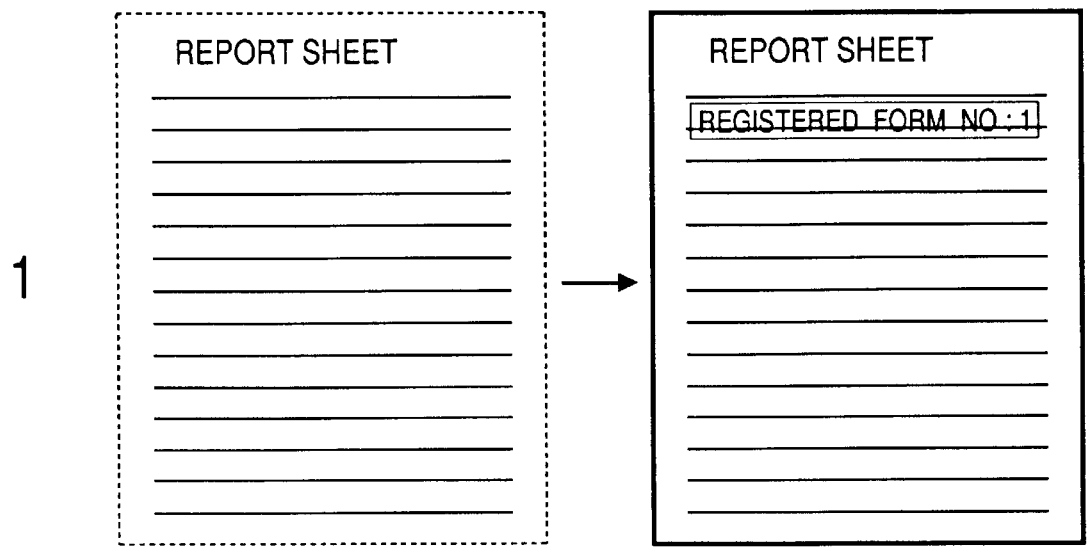
FIG. 8 is a diagram showing an output example of a form list in the second embodiment.
Figure 8:
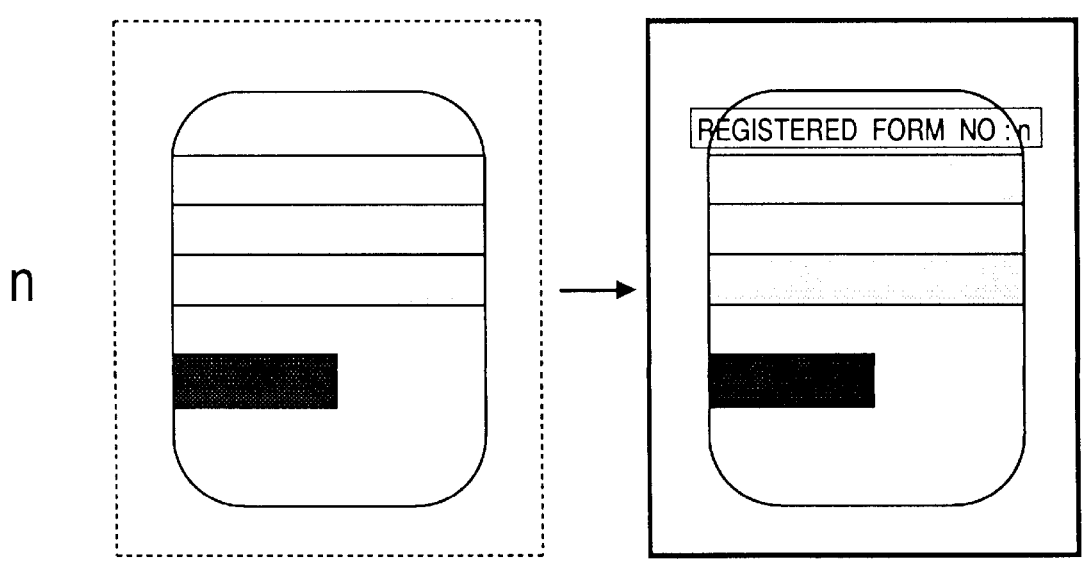

It is now assumed that the form data as shown in FIG. 8 (left side) has been stored in the form storage 12 (form memory 110). When the operator gives an instruction to print the form contents through the instructor 14, fundamentally, the contents in the form management table are examined and only the registered (stored) forms are developed in the frame memory 8 and printed. However, the form number of each form cannot be known only by the above method. In the second embodiment, accordingly, after the image corresponding to the form data was developed in the frame memory 8, the image indicative of the form number is also generated and is multiplexed and developed to a predetermined location.

Each form is printed as mentioned above in a state as shown in FIG. 8 (right side). As shown in the diagram, since each form is printed together with the form number, not only that the data has been registered in which form number but also the content of the form can be judged.

Figure 7:
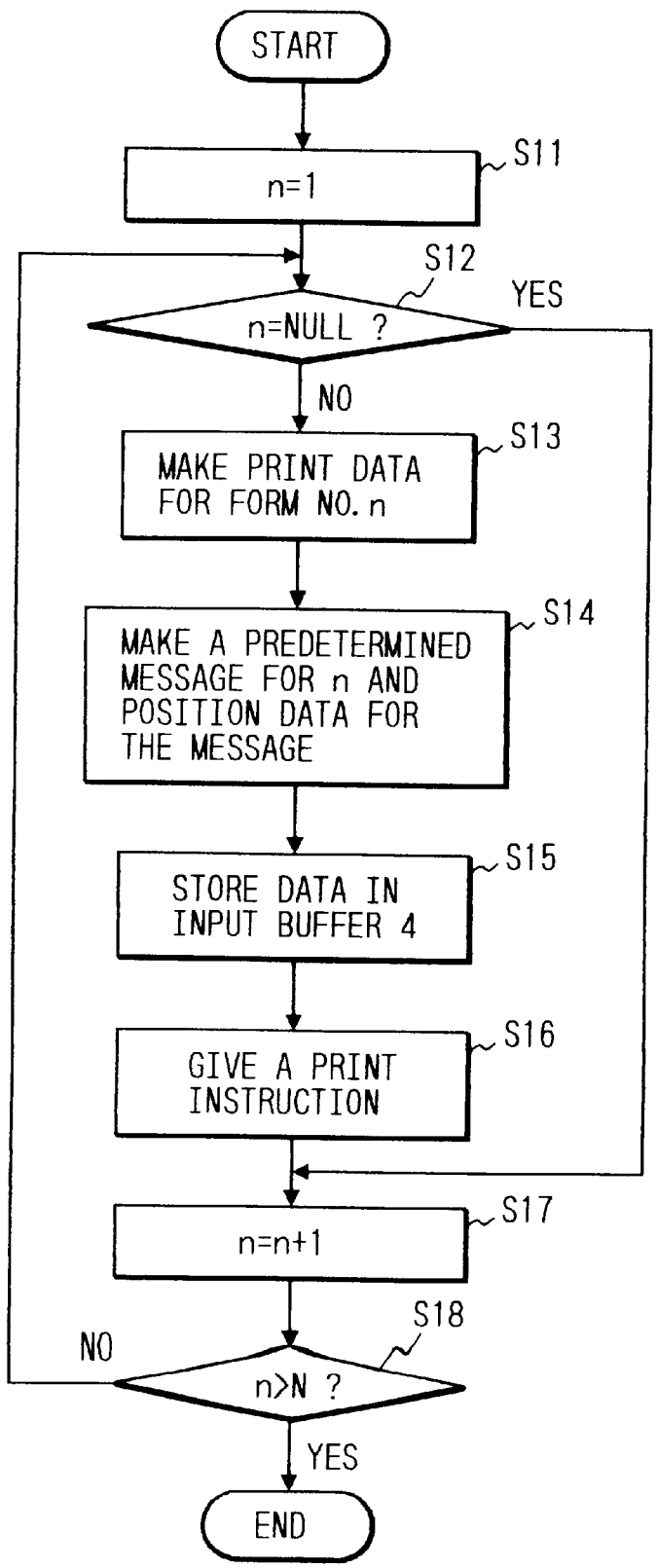
FIG. 7 is a flowchart showing a form list printing processes in the second embodiment.

To realize the above construction, the processes are executed in accordance with a flowchart shown in FIG. 7.

First, when an instruction to print the form content is received, an initial value "1" is substituted for the variable n indicative of the form number in step S11. In the next step S12, a check is made to see if the pointer corresponding to the variable n indicates "NULL" or not, namely, whether it has been registered or not by referring to the management table in the form storage 12. When the pointer doesn't indicates "NULL", namely, when it has been registered, in step S13, the form data corresponding to the number n is read out and the print data corresponding to the form data is generated. In step S14, a predetermined message corresponding to the variable n, for instance, as shown in FIG. 8, a character train of "registered form number: XX" and the data indicative of the printing position are formed. Numerals indicative of the value of the variable n are written into "XX" in the message.

When the print data for one form produced in steps S13 and S14 is formed, they are stored in the input buffer (step S15). A print instruction (new page instruction command) is given (step S16).

In step S17, the variable n is increased by only "1". In step S18, a check is made to see if the value of the new variable n is larger than the registration limit number N or not. By repeating the processes in step S12 to step S18 by N times, both of the form data and its registration number are recorded onto the same recording paper and generated.

In the second embodiment as well, when the form content is checked and printed, the print data has been stored into the input buffer. However, a print image can be also directly developed into the frame memory and printed.

According to the second embodiment as described above, the location of the stored form and the content of each form can be confirmed.

[Description of the third embodiment]

Figure 11:
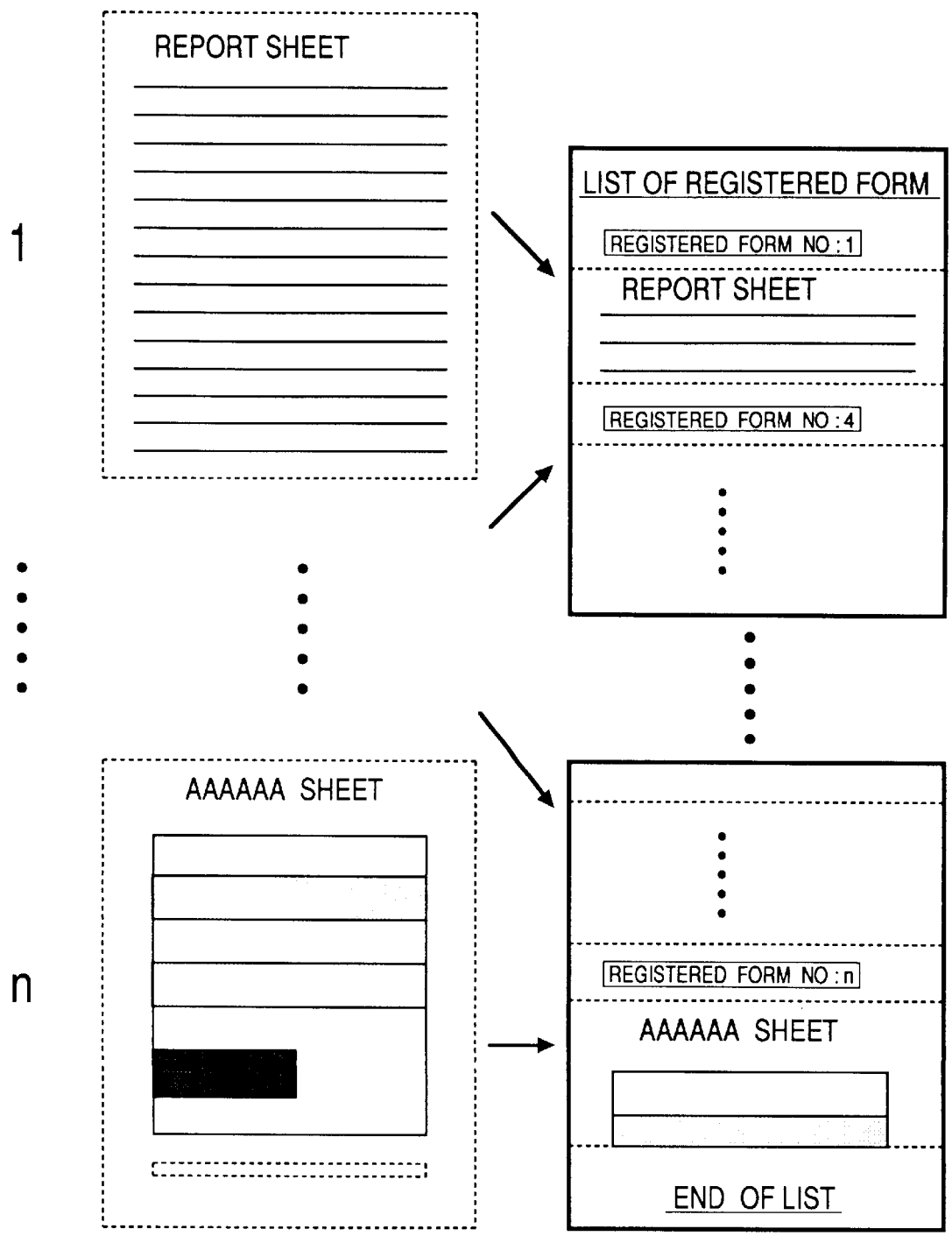
FIG. 11 is a diagram showing an output example of a form list in the third embodiment.

The third embodiment will now be described. In the above second embodiment, one form has been printed on one recording paper. However, it is also sometimes sufficient to know the form number used and the extent of the corresponding relation between the form number and the form. In the third embodiment, therefore, as shown in FIG. 11, by printing a plurality of parts of the form onto one sheet of recording paper, the number of recording papers is reduced when the form list is printed. A message to inform one that the apparatus is operating in the mode to print a list of registered (or stored) forms is added to the first page in the form list. A message indicative of the end of a series of form list printing processes is added to the last page. Further, the page number can be also added to each recording paper. As a printing size of each form, in the embodiment, only a fixed region of 3 cm from the top end of each form is set to a print target. The form number is added to each form and the form is printed in a manner similar to the above first and second embodiment.

Figure 9:
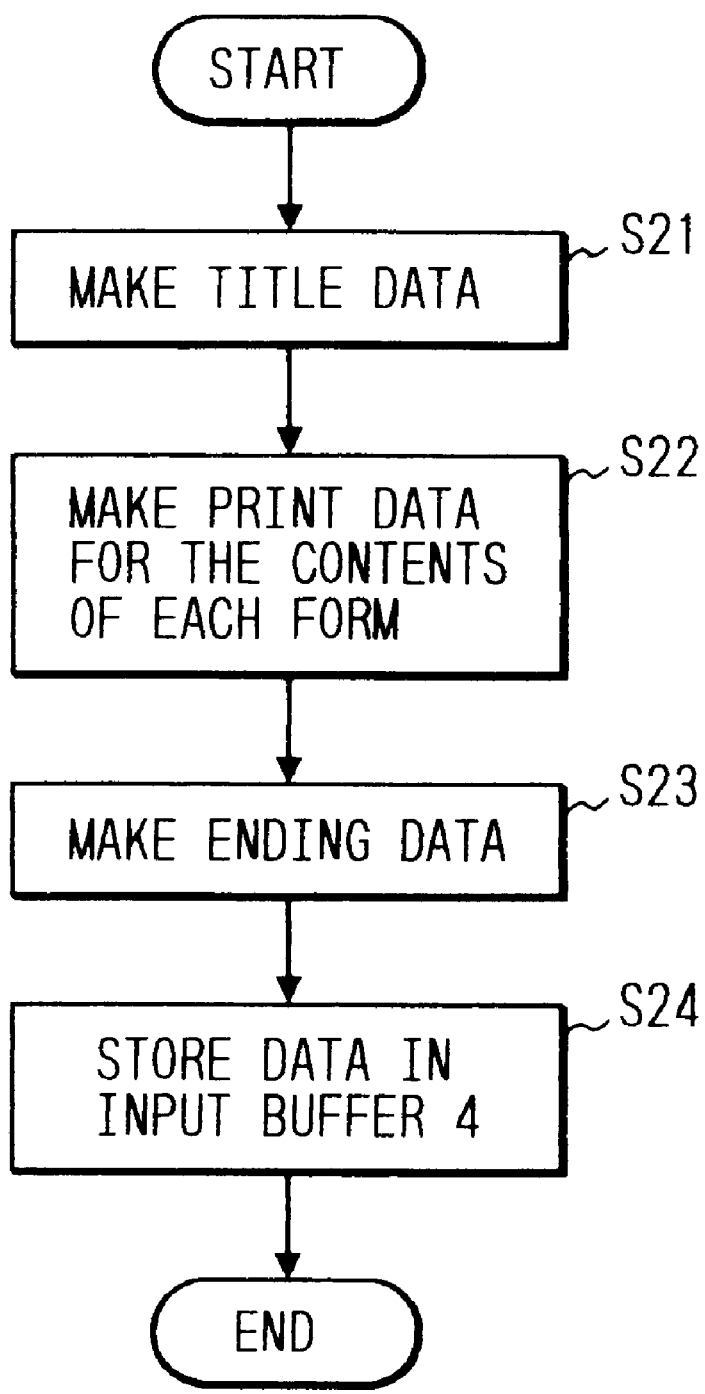
FIG. 9 is a flowchart regarding a form list printing in the third embodiment.

To realize the above processes, according to the third embodiment, the processes are executed in accordance with a flowchart shown in FIG. 9.

First, in step S21, print data of a title data portion which is added to the first page in the form list is made. In step S22, the registered form number is checked. This form number and the print data of a part of the content of the form are made with respect to all of the registered forms. In step S23, the print data of the ending portion is formed and step S14 follows. In step S14, the data formed in steps S21 to S23 is stored into the input buffer and the printing operation is started.

The processing content in step S22 will now be described in detail in accordance with a flowchart of FIG. 10.

First, in step S31, the initial value "1" is substituted for the variable n indicative of the form number. In the next step S32, a check is made to see if the pointer corresponding to the variable n indicates "NULL" or not, namely, whether it has been registered or not by referring to the management table in the form storage 12. When the pointer doesn't indicate "NULL", namely, if it has been registered, the print data (including a character train "registered form number:") of the number n is made in step S33. The print data of a part (3 cm from the top end) of the form is made in step S34. In the next step S35, the variable n is increased by only "1". In step S36, a check is made to see if the new value of n is larger than the registration limit number N or not. By repeating the processes in steps S32 to S36 as mentioned above by N times, a part of the whole registered form data and their registered numbers are made. In the case where the number of forms which can be recorded on one recording paper is equal to M, a new page command is added each time the M print data are made.

In the above third embodiment as well as a form list printing instruction, a corresponding instruction command, can be generated from the host computer or the print data is not stored in the input buffer, but the image can be also directly developed in the frame memory.

Although the fixed portion of 3 cm from the top edge of each form has been printed in the third embodiment, the invention is not limited to the numerical value and its position. For example, a region of a width of 5 cm of the central portion can be also used as a target to be printed.

As described above, according to the third embodiment, the location of the form stored and the content thereof can be confirmed and the memory medium can be efficiently used.

[Fourth embodiment]

The fourth embodiment will now be described. In the above third embodiment, the fixed position has been printed every form. However, each form ordinarily has a characteristic portion. In the fourth embodiment, therefore, each form characteristic portion is managed by the form management table. When the form list is printed, by printing the characteristic portion of each form, the above third embodiment is improved.

Figure 3:
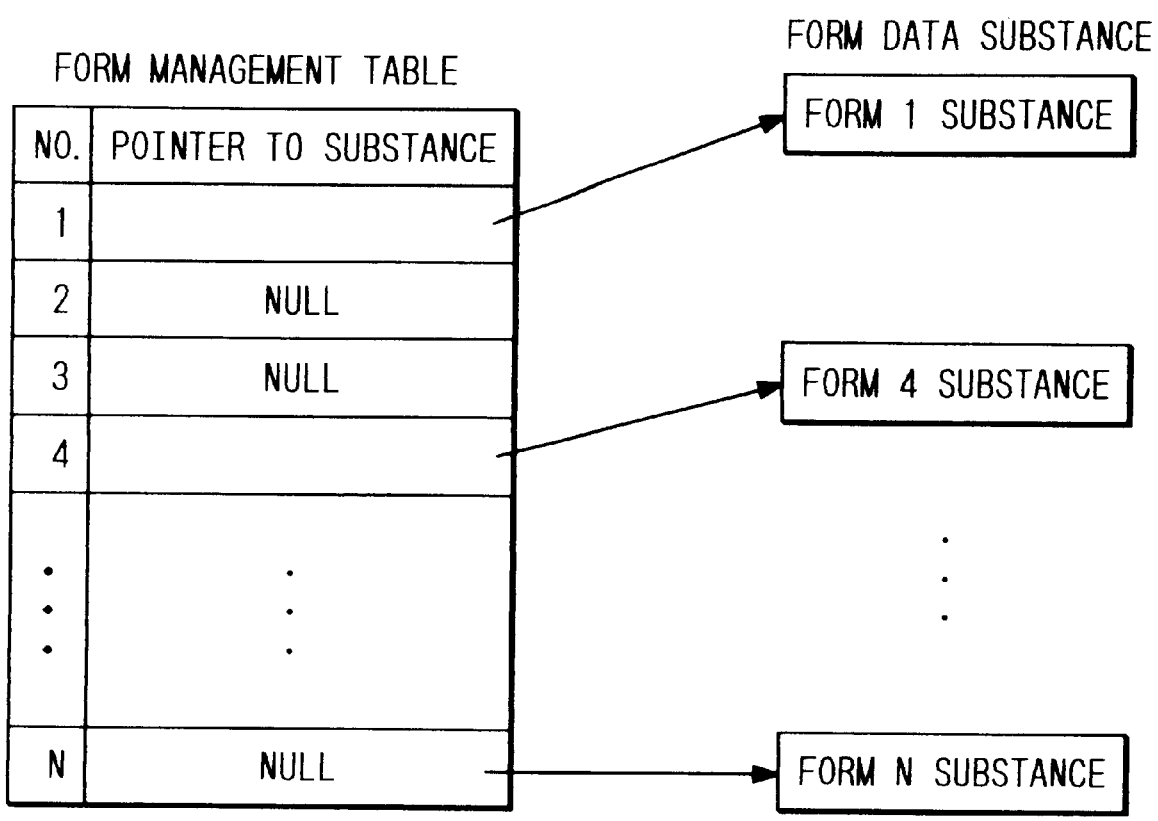
FIG. 3 is a diagram showing an example of a structure of a conventional form storage.
Figure 12:
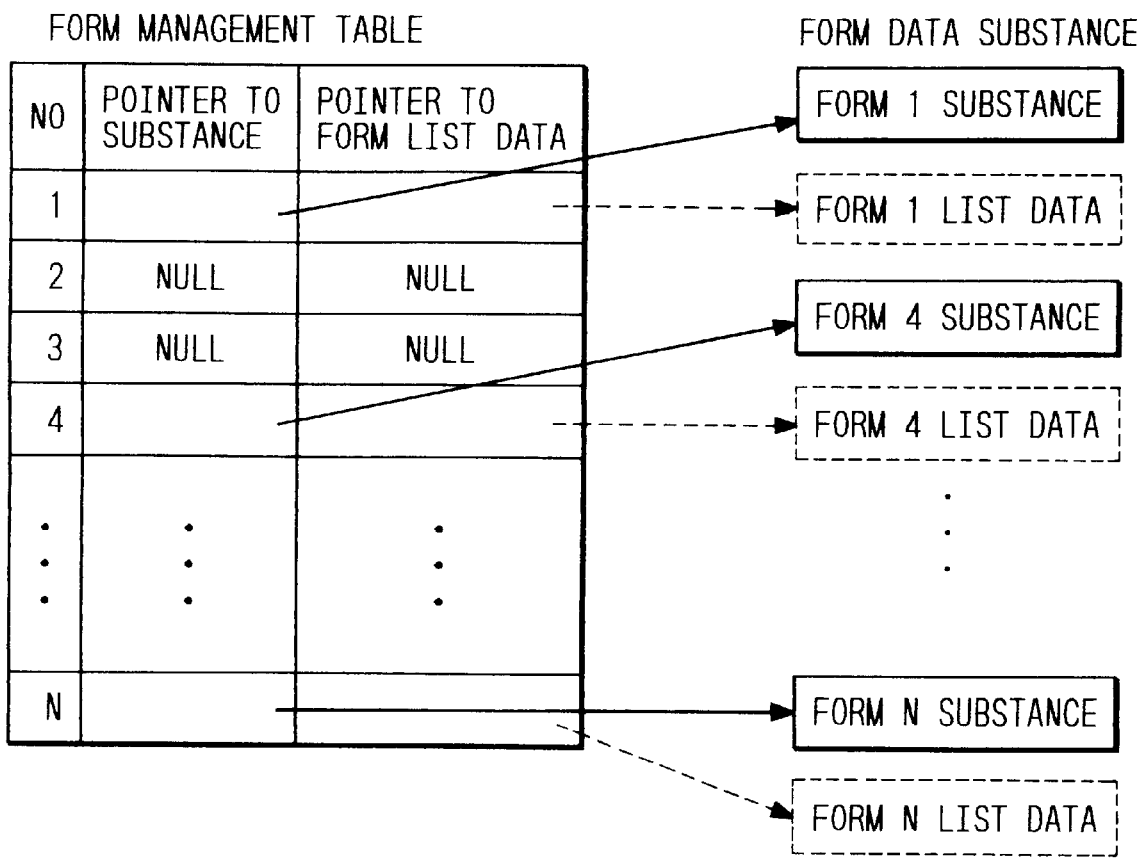
FIG. 12 is a diagram showing an example of a structure of a form storage in the third embodiment.

FIG. 12 shows the form management table in the form storage 12 in the fourth embodiment. As shown in the diagram, FIG. 12 differs from FIG. 3 with respect to a point that in addition to the table in FIG. 3, a pointer for printing of the list of each form is provided and an area to store the data to print the list is further provided.

It is now assumed that the data to print the form is continuously sent from the host computer when a form is registered.

Figure 10:
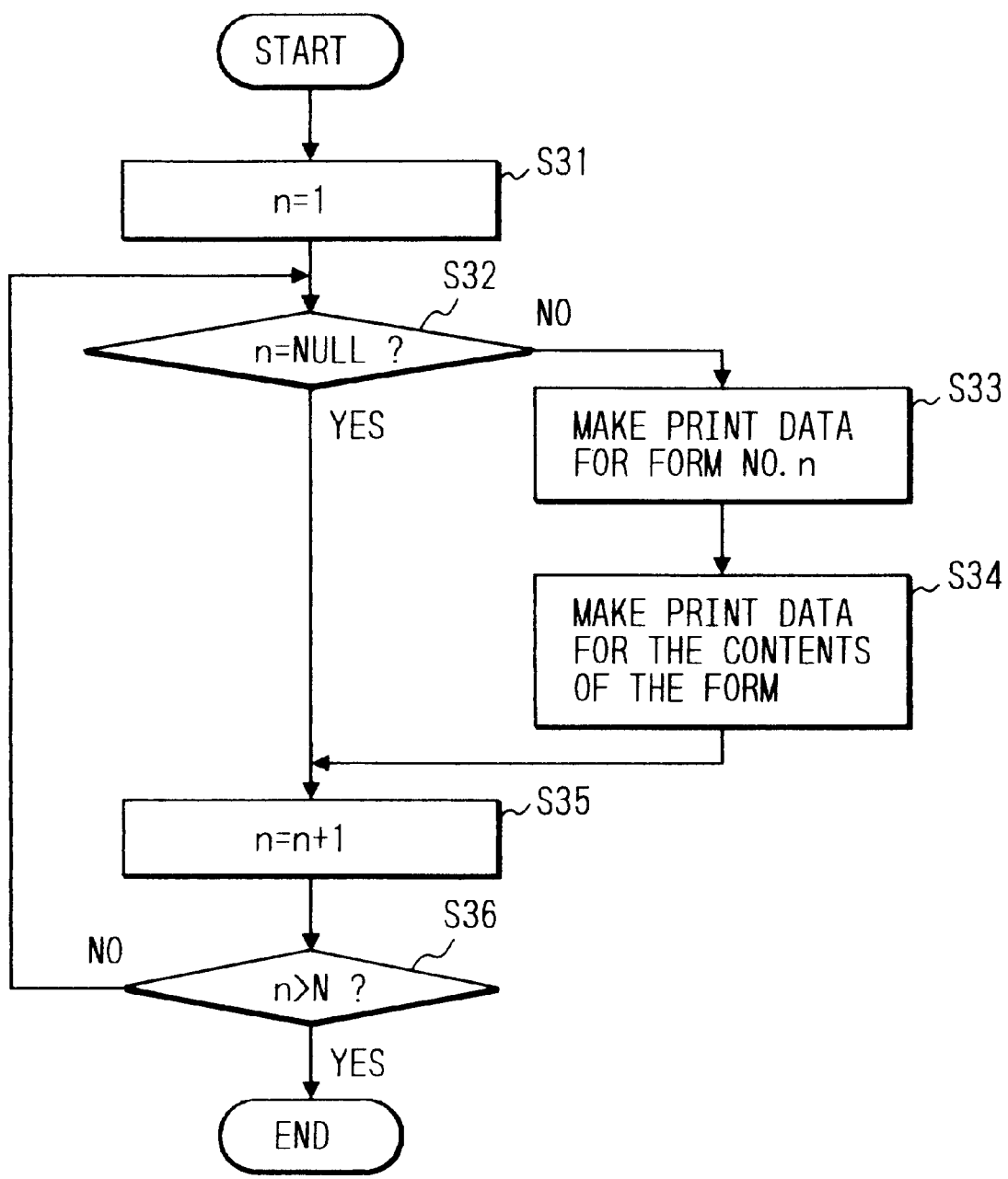
FIG. 10 is a flowchart showing the contents of form content print data forming processes in the third embodiment.

In the actual form list printing processes, for example, it is sufficient that the process in step S34 in FIG. 10 is set to "Make with reference to pointer for form list in form management table". Therefore, its description is omitted. On the other hand, in order to omit the troublesome occurence of the host computer purposely making the data for a form list, it is also possible to designate only two points (coordinates of the points at the left upper corner and right lower corner of a rectangular) indicative of a characteristic area and to make the data for the form list from the designated two points in the apparatus. When such an area is designated, a command for area designation and coordinates data can be also sent from the host computer or such an area can be also designated by an operation panel provided for the printer.

According to the fourth embodiment as described above, in addition to the above third embodiment, each of the stored forms can be easily judged.

Although the embodiment has been described with respect to an example of the laser beam printer as a printing system, the invention is not limited to the printing system as will be obviously understood from the above description.

According to the present invention as described above, the location of the stored form can be confirmed.

According to the second embodiment, the location of the stored form and its content can be confirmed.

According to the third embodiment, not only the location of the stored form and its content can be confirmed but also the recording medium can be efficiently used.

According to the fourth embodiment, further, in addition to the advantage of the third invention, each of the stored forms can be easily judged.

As described above, according to the present invention, it is possible to provide an output method and apparatus which can confirm the location of the stored form.

As described above, according to the invention, it is possible to provide an output method and apparatus in which a plurality of forms which are multiplexed to data for outputting and are outputted are previously stored and in the case where the generation of a list of stored forms is instructed, the form list can be outputted in a format indicative of at least the location of the effective form.

As described above, according to the invention, it is possible to provide an output method and apparatus in which the location of the stored form and its content can be confirmed.

According to the invention as described above, it is possible to provide an output method and apparatus in which a plurality of forms which are multiplexed to data for outputting and are outputted are previously stored and in the case where the generation of a list of a stored form is instructed, the form list can be outputted in a format indicative of at least the location of the effective form and its content.

According to the invention as described above, it is possible to provide an output method and apparatus in which the location of the stored form and its content can be confirmed and the output medium can be efficiently used.

According to the invention as described above, it is possible to provide an output method and apparatus in which a plurality of forms which are multiplexed to data for outputting and are outputted are previously stored and in the case where the generation of a list of stored forms is instructed, at least the location of the effective form and a part of the content of such a form are set to one set and a plurality of such sets are outputted onto one output medium.

According to the invention as described above, it is possible to provide output method and apparatus in which each of the stored forms can be easily judged.

According to the invention as described above, it is possible to provide an output method and apparatus in which a plurality of forms which are multiplexed to data for outputting and are outputted are previously stored and in the case where the generation of a list of stored forms is instructed, at least the location of the effective form and a portion that is peculiar to such a form are set to one set and a plurality of such sets are outputted onto one output medium.

According to the invention as described above, it is possible to provide output method and apparatus in which in the case where the generation of a form list is instructed, the form list is outputted in a format indicative of at least the location of the effective form.

What is claimed is:

1. An output apparatus comprising:

memory means having a capacity of storing a first plurality of forms each including ruled lines wherein each of the forms will be synthesized with data representing a character pattern upon output of the form and the data;

instructing means for providing a test instruction for generating and outputting a second plurality of forms from said memory means the second plurality being equal to or less than the first plurality; and output means, responsive to the test instruction provided by said instruction means, for generating and outputting the second plurality of stored forms, wherein said output means outputs the second plurality of forms on respective different pages.

2. An apparatus according to claim 1, wherein the forms have content, and wherein said output means further generates and outputs the form list with an indication of the contents of the plurality of stored forms.

3. An apparatus according to claim 1, wherein the forms have content, and wherein said output means groups information indicating where in said memory means a certain one of the plurality of forms is stored and a part of the content of the certain form into one set and outputs a plurality of such sets onto one sheet of an output medium.

4. An apparatus according to claim 1, wherein said output means groups information indicating where in said memory means a certain one of the plurality of forms is stored and a portion of the certain form that is peculiar to the certain form into one set and output a plurality of such sets to one sheet of an output medium.

5. An output processing method comprising the steps of:

storing a first plurality of forms, each including ruled lines, wherein each of the forms will be synthesized with data representing a character pattern upon output of the form and the data;

providing a test instruction for generating and outputting a second plurality of forms from said storing step, the second plurality being equal to or less than the first plurality; and generating and outputting the second plurality of stored forms, wherein said output means outputs the second plurality of forms on respective different pages in response to the test instruction provided in said instructing step.

6. A method according to claim 5, wherein the plurality of forms have content, and wherein in said outputting step, the form list is outputted with an indication of the contents of the plurality of stored forms.

7. A method according to claim 5, wherein the plurality of forms have content wherein said outputting step groups information indicating where a certain one of the plurality of forms is stored, and a part of the content of the certain format into one set and outputs a plurality of such sets onto one sheet of an output medium.

8. A method according to claim 5, wherein said output step groups information indicating where in said memory means a certain one of the plurality of forms is stored and a portion of the certain form that is peculiar to the certain form into one set and outputs a plurality of such sets to one sheet of an output medium.

9. A computer-readable medium encoded with a program for performing the steps of:

storing a first plurality of forms, each including ruled lines, wherein each of the forms will be synthesized with data representing a character pattern upon output of the form and the data;

providing a test instruction for generating and outputting a second plurality of forms from said storing step, the second plurality being equal to or less than the first plurality; and generating and outputting a second plurality of stored forms, wherein said output means outputs the second plurality of forms on respective different pages in response to the test instruction provided in said instructing step.

10. A computer-readable medium encoded with a program according to claim 9, wherein the plurality of forms have content, and wherein in said outputting step, the form list is outputted with an indication of the contents of the plurality of stored forms.

11. A computer-readable medium encoded with a program according to claim 9, wherein the plurality of forms have content wherein said outputting step groups information indicating where a certain one of the plurality of forms is stored, and a part of the content of the certain format into one set and outputs a plurality of such sets onto one sheet of an output medium.

12. A computer-readable medium encoded with a program according to claim 9, wherein said output step groups information indicating where in said memory means a certain one of the plurality of forms is stored and a portion of the certain form that is peculiar to the certain form into one set and outputs a plurality of such sets to one sheet of an output medium.

* * * * *

UNITED STATES PATENT AND TRADEMARK OFFICE
CERTIFICATE OF CORRECTION

PATENT NO. : 5,915,258

DATED : June 22, 1999

INVENTOR(S): YOICHI TOYOKURA                              Page 1 of 2

It is certified that error appears in the above-identified patent and that said Letters Patent is hereby corrected as shown below:

On the title page,item

AT [56] REFERENCES CITED; U.S. PATENT DOCUMENTS:

"Fugumura" should read --Fukumura--.

COLUMN 1:

Line 48, "an" should be deleted.

COLUMN 2:

Line 51, "indicative" should read --indicative of--.

COLUMN 3:

Line 27, "block" should read --block diagram--; and
Line 30, "cesses" should read --cess--.

UNITED STATES PATENT AND TRADEMARK OFFICE
CERTIFICATE OF CORRECTION

PATENT NO. : 5,915,258

DATED : June 22, 1999

INVENTOR(S): YOICHI TOYOKURA

It is certified that error appears in the above-identified patent and that said Letters Patent is hereby corrected as shown below:

COLUMN 7:

Line 65, "been" should be deleted.

COLUMN 8:

Line 18, "occurence" should read --occurrence--;
Line 26, "nates" should read --nate--; and
Line 52, "are outputted" should be deleted.

Signed and Sealed this

Twenty-eighth Day of November, 2000

Attest:

Q. TODD DICKINSON

Attesting Officer

Director of Patents and Trademarks